March 27, 1934.  O. MITCHELL  1,952,274
PRESSED STEEL BEARING MOUNTING
Filed Nov. 14, 1932
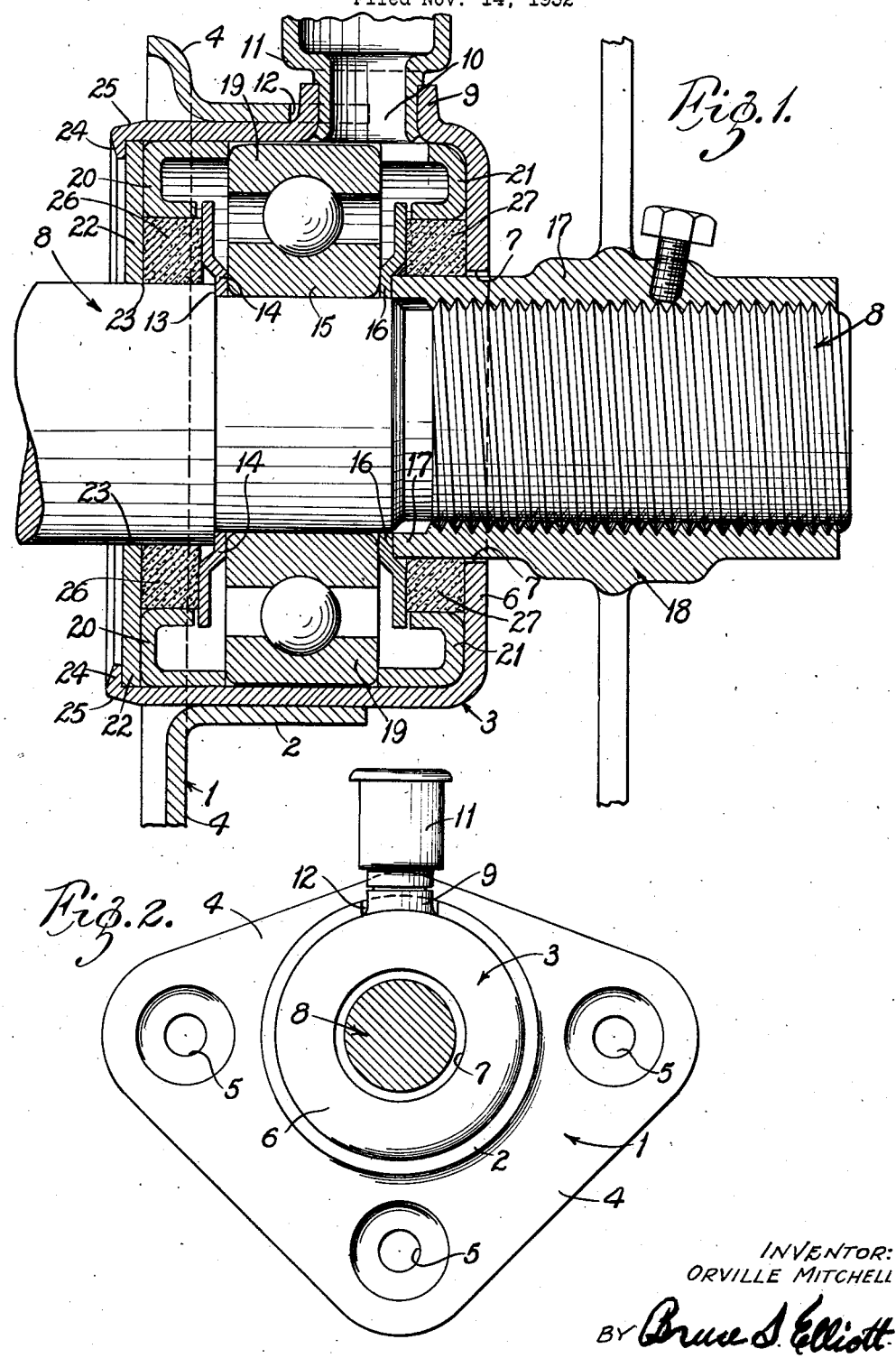
INVENTOR:
ORVILLE MITCHELL
BY Bruce S. Elliott
ATTORNEY.

Patented Mar. 27, 1934

1,952,274

UNITED STATES PATENT OFFICE 1,952,274

PRESSED STEEL BEARING MOUNTING

Orville Mitchell, Dallas, Tex.

Application November 14, 1932, Serial No. 642,555

3 Claims. (Cl. 308—187)

This invention relates to certain new and useful improvements in pressed steel mountings for ball-bearings, and has for its general object to provide means for mounting a bearing of this character in such manner as to secure and maintain proper alignment at each end of the shaft, or at each end of a machine in which bearings for the shaft are mounted, under all working conditions, without the necessity of employing self-aligning bearings.

Another object of the invention is to provide a sheet-metal enclosure for an anti-friction bearing and sealing members that will prevent the escape of lubricant from, and the entrance of dirt to, the bearing, with means whereby the supply of lubricant may be renewed.

With the above general objects in view, my invention resides, primarily, in the provision of a cylindrical sheet metal housing inclosing the bearing and oil sealing members and having an opening surrounded by an upwardly-extending wall, forming a projection in which a suitable oil cup is mounted for supplying lubricant to the bearing and at the same time preventing the entrance of dirt thereto. The sheet metal housing is mounted in a cylindrical holder in such manner as to permit a slight degree of movement between the wall of the housing and the wall of the holder, the latter being provided at one end with an apertured flange portion, whereby it may be bolted to the frame of the machine, and with a slot in its wall at the other end for receiving the projection of the bearing housing, through the opening in which lubricant is supplied to the bearing.

It also resides in securing the bearing, as a whole, in position in the housing by clamping the outer race of the bearing by the housing itself, while the inner race is clamped in position on the shaft by the pulley hub, which extends into the bearing through its outside opening, the inside sealing member bearing against a shoulder on the shaft, while the outside sealing member bears against the hub of the pulley.

The advantages incident to the above structural features will be indicated during the course of the detailed description of the invention to follow.

In the accompanying drawing—

Figure 1 is a longitudinal sectional view through a bearing housing and holder constructed according to my invention; and Figure 2 is a view in front elevation of the same.

Referring now to the drawing, the numeral 1 indicates my improved holder, having a cylindrical portion, 2, for receiving the housing, 3, and provided at one end with a flange portion, 4, preferably of substantially triangular shape shown in Figure 2, and provided with apertures, 5, by means of which it may be bolted to the frame of a machine.

The housing 3 is of general cylindrical shape, being substantially closed at one end by a wall, 6, having a central opening, 7, for receiving the shaft, 8, and being open at its opposite end. On its upper side, and near its closed end, the wall of the housing 3 has an opening surrounded by an upward cylindrical projection, 9, in the bore, or opening, 10, of which an oil cup, 11, is fitted in a manner to seal the opening against the escape of oil on the one hand and the entrance of dirt on the other. The wall of the holder 1 is provided on its upper side, at the end opposite that containing the flange 4, with an elongated recess, 12, for receiving the cylindrical extension 9, when the bearing housing is inserted in the holder. This arrangement, that is, the fitting of the projection 9, in the recess 12, not only prevents any tendency for the housing to turn with the shaft, but is utilized for limiting end play of the shaft carried by the bearings. The arrangement of the bearing and sealing members within the housing 3 will now be briefly described.

The shaft 8 is provided with a shoulder, 13, against which bears a disk, 14, inserted on the shaft, and which is engaged by one end of the inner race, 15, of the bearing, a similar disk, 16, being inserted on the shaft to engage the other end of said race, these parts being firmly pressed into engagement so as to turn with the shaft through the medium of a hub, 17, of a pulley, 18, which hub is screwed on the shaft to cause its inner end to engage the disk 16. The outer race, 19, of the bearing is engaged at opposite ends, respectively, by two pressed steel cups, 20, and 21. The cup 21 engages the wall 6 of the housing, and the cups 20 and 21 are caused to firmly clamp the outer race 19, by means of a disk, 22, having a central opening, 23, for receiving the shaft and being held in firm engagement with the cup 20 by bending the inner end of the wall of the housing over the outer periphery of said disk, as indicated at 24. To enable this to be done, the inner end of the wall of the housing is beveled, as indicated at 25. A felt sealing washer, 26, is located between the disks 22 and 14 and surrounded by the cup 20 at the inner end of the bearing, said felt washer having an inner circumference adapting it to snugly embrace the shaft 8. A similar washer, 27, is engaged on three sides by the disk 16, cup 21 and wall 6 of the housing, and has an inner circumference adapting it to snugly embrace the hub 17 of pulley 18.

In order that the advantages of the present construction may be clearly understood, a brief statement of objections incident to the use of standard forms of bearings will be given.

In the case of standard pressed steel mountings for ball-bearings, it is impossible to bolt a considerable number of mountings or housings to the frame work of a machine without having some of the housings carrying the same shaft out of alignment with each other. In the case, for example, of cotton cleaning machines, for use with which my improved bearing is more particularly intended, the end frames, or plates, are stamped from sheet steel, they are seldom perfectly parallel with each other, and the frames themselves are not perfectly straight. Furthermore, the bosses on the frames to which the mountings or housings are bolted are not always exactly in the same plane. Therefore, when rigid sheet metal housings carrying the bearings and sealing members are bolted to the end frames of machines, the bearings are often thrown out of alignment with each other by the mounting itself, irrespective of the turning of the shaft. Even if the plates, or machine frames, to which the bearing housings are secured were perfectly straight and parallel with each other, so as to permit perfect alignment while the machine was not running, there is often slight misalignment in operation due to deflection in the shaft, and which, of course, takes place in each revolution of the shaft.

While it is true that misalignment due to any of the above causes can usually be compensated for by the use of self-aligning bearings, such bearings are more expensive than the plain radial bearings and do not have the load-carrying capacity of the latter. Furthermore, even with the use of self-aligning bearings the sealing members within the housing are strained out of position with bad alignment, causing unnecessary leakage of lubricant or permitting the entrance of dust or dirt into the bearings; and any eccentricity or misalignment of the shaft in operation makes it very difficult to seal the bearing against the outlet of lubricant or inlet of dust or dirt.

All of the above difficulties have been overcome by the present invention, which presents a sealed housing, in which the bearing and sealing members are inclosed and held in proper position in relation to each other, and the housing itself, being loosely mounted in a holder bolted to the machine, not only permits a deep-groove type of radial bearing, but also the sealing members on each side of it, to line themselves perfectly with the shaft without any strain on the bearing itself or the sealing members and since the housing is free to move or rock slightly within the holder, it takes care of any misalignment due to shaft deflection while the machine is in operation.

The particular means for sealing the bearing against the escape of lubricant, illustrated in the drawing and described herein, is considered novel in itself and is not directly claimed herein.

I claim:

1. In combination with a sheet metal cylinder flanged at one end around a shaft opening, an anti-friction bearing and its sealing members inserted in said housing through the opposite end thereof and having its outer race clamped by said cylinder, a shaft supported by said bearing and projecting through said opening, means for holding the bearing and sealing members in position after they are inserted, comprising a shoulder on said shaft engaged by one of said sealing members and a hub secured on the projecting end of said shaft and having its inner end engaging the other of said sealing members a projection on the wall of the cylinder having an opening therein through which lubricant can be supplied to the bearing, and means secured in said opening for preventing the inlet of dirt to the bearing.

2. In combination with a shaft, an anti-friction bearing therefore having inner and outer sealing members, a housing enclosing the same comprising a sheet metal cylinder having clamping engagement with the outer race of the bearing and flanged at one end and open at the opposite end to permit insertion of the bearing and sealing members, means integral with the cylinder at its open end for holding the bearing and sealing members in position after they are inserted and means for clamping the inner race in position comprising a shoulder on the shaft engaged by the inner sealing member and a pulley secured on a projecting end of said shaft and having its inner end extending through an opening in the flanged side of said housing and engaging the outer sealing member.

3. In combination with a sheet metal housing, an anti-friction bearing mounted therein, the outer race of which is clamped by said housing, inner and outer sealing members enclosed by said housing and operating to prevent the escape of lubricant from, and the entrance of dirt to, the bearing, a shaft supported by said bearing having a shoulder engaged by the inner sealing member, a pulley having a hub secured on a projecting end of said shaft with its inner end projecting into said housing and engaging the outer sealing member, whereby to clamp the inner race in position, and a rigid holder in which the sealed housing is loosely mounted to permit self-alignment.

ORVILLE MITCHELL.